United States Patent Office 3,556,870
Patented Jan. 19, 1971

3,556,870
METHOD OF PREOXIDIZING NUCLEAR REACTOR COMPONENTS OF ZIRCONIUM ALLOYS
Werner Debray, Ullrich Mattern, and Lothar Stieding, Erlangen, Germany, assignors to Siemens Aktiengesellschaft, a corporation of Germany
Filed Sept. 27, 1967, Ser. No. 670,979
Claims priority, application Germany, Sept. 30, 1966, S 106,324
Int. Cl. C23f 7/02; G21c 21/00
U.S. Cl. 148—6.3                                  3 Claims

ABSTRACT OF THE DISCLOSURE

Described is a method of preoxidation of nuclear reactor components of zirconium alloys, using water or water vapor. The process characterized by a multistep treatment whereby the usual preoxidation in water vapor of 400° C. is preceded by treatment in water or vapor, at temperatures between 200–350° C. and preferably 250–300° C. over a period of 1–4 days.

---

Figure 1:
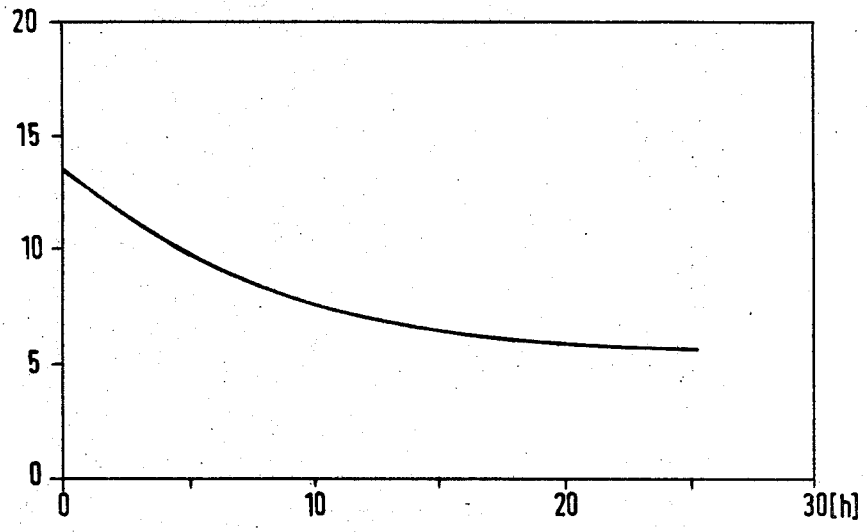

Our invention relates to a method of preoxidizing nuclear reactor components of zirconium alloys, with the aid of water or water vapor. A preoxidation of components of zirconium alloys in the course of their fabrication is generally known and is used whenever these components are employed in water or vapor-cooled nuclear reactors.

The purpose of preoxidation is to provide the components with an oxide layer which serves as a protection in the handling during further processing, transportation and assembly. The oxide layer also serves to increase the recognition of certain surface impurities (particularly nitrogen), stemming from the production steps. The recognition of these contaminated localities is an absolute necessity as corrosion would increase there during the operation of the reactor, leading to a premature loss of such components. Also, during the preoxidation process these localities corrode more, which corrosion is noticeable by a white coloring of the otherwise black oxide layer.

The heretofore known preoxidation treatment for zirconium alloys, such as for example zircalloy 2 and zircalloy 4 is effected in autoclaves with water vapor, at approximately 400° C. and takes about 3 days. Hence, this preoxidation technique requires a relatively long time for it to become noticeable whether zirconium components are perfect or not.

In addition, the oxide layer produced by this method causes, during the ensuing corrosion in water, an undesirably higher percentage of hydrogen absorption when the reactor is in operation, than when the preoxidation layer is missing. An increased hydrogen absorption is, however, detrimental and produces a stronger alteration of the mechanical properties (embrittlement).

An additional disadvantage of the oxidation method is that it provides inadequate proof of nitrogen impurities.

In view of the above, our invention has the following objectives:

(1) Shortening the time for recognizing surface impurities;
(2) Improving the recognition, especially of nitrogen impurities; and
(3) Improving the quality of the preoxidation layer with respect to a lower percentage hydrogen absorption, during the operation of the reactor.

To this end, and in accordance with the method of the present invention, we use a two-step processing by preceding the usual preoxidation in water vapor at 400° C., with a treatment in water or steam at lower temperatures, within a range of 200–350° C., preferably 250–300° C., during a period of 1–4 days.

Tests which we have carried out show that the first process step alone, at low temperatures, may fulfill the required three demands, while the second processing step in a vapor of 400° C., delivers only the necessary oxide layer for the manipulating (handling) protection. How far the above-mentioned three demands may be individually met is determined by the selection of the temperatures and the duration of the first processing step.

The following processing establishes an optimum for shortening the time of recognition of surface impurities with equally good recognition, compared to the heretofore common preoxidation in a vapor of 400° C. (about 3 days), but a considerably improved proof of nitrogen impurities.

One day of preoxidation in water at 300° C. (88 at.), if non-permissible errors are found following this treatment, then the second processing step in a vapor of 400° C. becomes superfluous.

A considerable improvement in the quality of the preoxide layer with regard to a low percentage hydrogen absorption can be obtained if the minimum dwell time, depending upon the temperature, is selected during the first process step.

Figure 2:
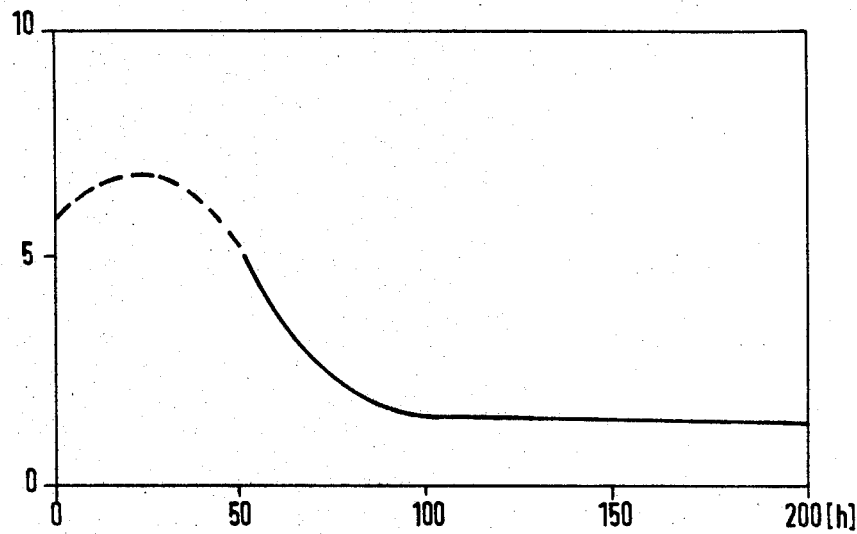

The drawing shows in FIGS. 1 and 2, test results using our invention.

According to test results, graphically illustrated in FIG. 1, this minimum dwell amounts to 24 hours at 300° C. and 96 hours at 250° C. There is reason to believe that the oxide layer produced at a lower temperature of 250° constitutes a stronger hydrogen diffusion blockage than the layer produced at 300° C. The percentage hydrogen absorption obtained thereby, according to simulated reactor conditions, is shown in FIG. 2 and is lower than the values for untreated parts. Additional corrosion as a manipulation or handling protection did not occur here. Naturally this may be omitted if further processing of the zirconium components does not require the same, which under these prerequisites can only prove to be of advantage. Some test results from FIG. 1, extracted once more by numbers, clearly show the success of the two-step processing as compared to the previous one-step processing in steam at 400° C.

PRE-CORROSION+LENGTHY CORROSION
UNDER SIMULATED CONDITIONS OF
REACTOR OPERATION (60 days in water, at 340° C.)

Hydrogen absorption, percent
One-step processing+lengthy corrosion
  (3 days in vapor at 400° C.) _____ 13.5
Two-step processing+lengthy corrosion (½ day
  in water at 300° C. and 2 days in vapor
  at 400° C.) _____ 7
Two-step processing+lengthy corrosion (1 day in
  water at 300° C. and 2 days in vapor at 400° C.___ 5.4
No pre-oxidation, only lengthy (long period)
  corrosion _____ 5.2

Thus, the method of the present invention for preoxidation of nuclear reactor components of zirconum alloys, as for example, encasing tubes of combustion rods, is effected as follows:

(a) generally used purification processes,
(d) preoxidation of the perfect components for a 2nd in water or steam, preferably 24 hours in water, at 300° C. (88 at.),
(c) examination of components relative to surface errors and nitrogen impurities, (d) preoxidation of the perfect components for a 2nd processing step consisting of approximately 48 hours in steam, at 400° C.

We claim:
1. The method of preoxidation of nuclear reactor components of zirconium alloys, which comprises preceding the usual preoxidation in water vapor at 400° C., by a preliminary treatment in water at a temperature between 200–350° C., over a period of 1 to 4 days.
2. The method of claim 1, wherein the preliminary treatment is in steam at a temperature from 250–300° C.
3. The method of claim 1, wherein the preliminary treatment is in water of 300° C. (88 at.) for a period of approximately 1 day, whereby nitrogen errors are readily recognized and the hydrogen absorption within the reactor is reduced.

References Cited

UNITED STATES PATENTS

| | | | |
|---|---|---|---|
| 1,925,307 | 9/1933 | De Boer et al. | 148—6.3X |
| 2,917,419 | 12/1959 | Robinson | 148—6.3 |

RALPH S. KENDALL, Primary Examiner

U.S. Cl. X.R.

176—88